United States Patent Office 3,681,198
Patented Aug. 1, 1972

3,681,198
FERMENTATION PROCESS FOR PREPARING (—)(CIS-1,2-EPOXYPROPYL)PHOSPHONIC ACID
Raymond F. White, Englishtown, N.J., and Arnold L. Demain, Wellesley, Mass., assignors to Merck & Co., Inc., Rahway, N.J.
No Drawing. Filed May 13, 1970, Ser. No. 37,046
Int. Cl. C12d 9/00
U.S. Cl. 195—80                    10 Claims

ABSTRACT OF THE DISCLOSURE

Increased yields of the antibiotic (—)(cis-1,2-epoxypropyl)phosphonic acid are obtained by the addition of certain phosphatides to fermentation media. The antibiotic, which is produced by growing newly found strains of Streptomyces on suitable fermentation media, is active against both gram-positive and gram-negative bacteria.

BACKGROUND OF THE INVENTION

The discovery of the remarkable antibiotic properties of penicillin stimulated great interest in this field which has resulted in the finding of many other valuable antibiotic substances such as streptomycin gramicidin, subtilin, bacitracin, chlortetracycline, oxytetracycline, and the like. In general, such antibiotics are particularly active against certain gram-negative bacteria, others are active against gram-positive bacteria and some are active against both gram-negative and gram-positive bacteria. However, the activity of these known antibiotics is usually limited to a few pathogenic microorganisms, and work has been continued in this field in an attempt to find other antibiotics which would be effective against other pathogens.

Although some of these antibiotics have been found to be invaluable in the treatment of various diseases, it is found that certain strains of some pathogens develop a resistance to a particular antibotic and, as a result, the antibiotic is no longer active against such resistant strains.

Accordingly, the deficiencies of the known antibiotics have stimulated further research to find other antibiotics which will be active against a wider range of pathogens as well as resistant strains of particular microorganisms.

(—)(cis - 1,2 - epoxypropyl)phosphonic acid, an antibiotic substance active against various pathogens, is produced by growing suitable species of Streptomyces in media containing suitable sources of carbon, nitrogen and inorganic salts. However, the yields of antibiotic obtainable in the usual fermentation media are low and means for producing the antibiotic in enhanced yields have been sought.

DESCRIPTION OF THE INVENTION

The invention relates to the production of a new and useful antibiotic known chemically as (—)(cis-1,2-epoxypropyl)phosphonic acid and, in particular, to an improved method for the production of the antibiotic by fermentation of nutrient media with suitable strains of microorganisms such as, for example, Streptomyces.

The antibiotic is produced during the aerobic fermentation of suitable aqueous nutrient media under controlled conditions. Aqueous media such as those employed for the production of other antibiotics are suitable for producing (—)(cis-1,2-epoxypropyl)phosphonic acid. Such media contain sources of carbon and nitrogen which are assimilable by the microorganism, and inorganic salts. In addition, the fermentation media contains traces of metals necessary for the growth of the microorganism which are commonly supplied as impurities incidental to the other constituents of the medium. In general, carbohydrates such as sugars, for example dextran, maltose, galactose, glucose, and the like, and starches such as grains, for example oats and rye, corn starch, corn meal, and the like can be used either alone or in combination as sources of assimilable carbon in the nutrient medium. The exact amount of the carbohydrate source or sources utilized in the medium will depend in part upon the other ingredients of the medium. It has been found, however, that an amount of carbohydrate between about 1 and 6% by weight of the medium is sufficient. A single carbon source may be used, or several carbon sources may be combined in the medium.

Satisfactory nitrogen sources include myriad proteinaceous materials such as various forms of hydrolysates of casein, soybean meal, corn steep liquor, distillers solubles, yeast hydrolysates, tomato paste, and the like. The various sources of nitrogen can be used either alone or in combination, and are used in amounts ranging from 0.2% to 6% by weight of the aqueous medium.

(—)(Cis-1,2-epoxypropyl)phosphonic acid is formed by growing, under controlled conditions, strains of microorganisms such as, for example, those strains of the genus Streptomyces which produce the antibiotic. One such microorganism, which was isolated from soil, has been designated MA–2893 in the culture collection of Merck & Co., Inc., Rahway, N.J.; sub-isolates from the parent culture have been designated MA–2911, MA–2912, and MA–2913. These cultures have been placed on permanent deposit with the culture collection of the Northern Utilization Research & Development Branch of the United States Department of Agriculture at Peoria, Ill., and have been assigned the culture numbers NRRL B–3357, NRRL B–3358, NRRL B–3359, and NRRL B–3360, respectively. These microorganisms have been classified in the species *Streptomyces fradiae*.

The antibiotic is also produced by growing, under controlled conditions, other strains of Streptomyces also isolated from soil and identified in the Merck & Co., Inc. culture collection as cultures MA–2867, MA–2903, MA–2916, MA–2917, MA–3270, and MA–3269. Cultures MA–2903, MA–2867, MA–2916, MA–2917, and MA–3270 which have been classified as members of the species *Streptomyces viridochromogenes* have been placed on permanent deposit with the culture collection of the Northern Utilization Research and Development Division of the United States Department of Agriculture and have been assigned the culture numbers NRRL–3413, NRRL–3414, NRRL–3415, NRRL–3416, and NRRL–3427, respectively.

Culture MA–3269 had been assigned to the species *Streptomyces wedmorensis* and has been assigned an NRRL number of 3426.

In addition to the above species of microorganisms, also contemplated is the use of other microorganisms, including strains of Streptomyces either isolated from nature or obtained by mutation of these organisms, such as those obtained by natural selection or those produced by mutating agents, such as, for example, X-ray irradiation, ultraviolet irradiation, nitrogen mustards, and the like.

Due to the inherent difficulty is separating pure (—)(cis-1,2-epoxypropyl)phosphonic acid from the large quantities of impurities in the fermentation broth, it is of great importance to find a way to increase the concentration of the antibiotic relative to the total broth solids.

By the present invention, it has been demonstrated that the growing of a microorganism capable of producing (—)(cis-1,2-epoxypropyl)phosphonic acid in a nutrient medium containing at least 50 γ/ml. of one or more phosphatides will enhance the production of the antibiotic. In particular, the addition to the fermentation medium of phosphatides such as phosphatidyl ethanolamine, phosphatidyl choline, phosphatidyl-L-serine or cephaline to fermentation media results in a significant increase in the production of the antibiotic. The amount of the phosphatide needed to stimulate production of the antibiotic varies depending upon the particular phosphatide and the medium employed. The actual concentration of the phosphatide employed in a given formulation medium will vary depending upon the particular microorganism used and the fermentation conditions employed. Improved production of the antibiotic has been observed when as little as 50 $\gamma$/ml. of the phosphatide is in the fermentation medium. In general however, it is preferred to use from 100 to 1000 $\gamma$/ml. of the phosphatide. The phosphatides have been found to have a stimulating effect on the production of (—)(cis-1,2-epoxypropyl)phosphonic acid, but were observed to have no effect, either stimulating or inhibitory, on the growth of the microorganism.

It is to be noted also that the phosphatide is added to a nutrient medium system which is already capable of producing the antibiotic. The presence of the aforementioned phosphatide is to improve the yields of (—)(cis)-1,2-epoxypropyl)phosphonic acid and not to cause its production.

The phosphatide is added to the fermentation medium by dissolving it in ether, sterilizing by millipore filtration, and adding it to a production flask of a basal medium to the final concentration desired. Alternatively, the phosphatide can be sterilized by autoclaving at 120° C. and 15 p.s.i. for 15 minutes, and adding sufficient sterile basal medium to effect the desired concentration. This may then be inoculated with the proper microorganism for production.

A single phosphatide may be utilized to stimulate production of the antibiotic, however, improved results are obtained if a combination of one or more phosphatides is employed.

Also contemplated is the use of phosphatides in combination with other agents stimulating to the growth of the antibiotic and the synergistic effect resulting therefrom. More specifically, the synergistic combination of one or more of the phosphatides discussed above and L-cysteine, for the stimulation of production of (—)(cis-1,2-epoxypropyl)phosphonic acid. The cysteine may be employed in concentration ranging from 50 to 1000 $\gamma$/ml. in the basal medium. For example, when 500 $\gamma$/ml. of the cephalin is added to the fermentation medium, production is increased from 13.5 $\gamma$/ml. to 20.1 $\gamma$/ml. of the antibiotic. When 500 $\gamma$/ml. of L-cysteine is used, production increases from 13.5 to 19.5 $\gamma$/ml. However, when the combination of 500 $\gamma$/ml. of L-cysteine and 50 $\gamma$/ml. of cephalin is used, production increases to 40.0 $\gamma$/ml. of (—)(cis-1,2-epoxypropyl)phosphonic-acid.

Although the new antibiotic of this invention is produced by both surface and submerged cultures, it is presently preferred to carry out the fermentation in the submerged state. Small scale fermentations are conveniently carried out by placing suitable quantities of nutrient medium in flasks, sterilizing the flasks and contents by heating to 120° C., inoculating the flasks with either spores or a vegetative cellular growth of a (—)(cis-1,2-epoxypropyl)phosphonic acid producing microorganism, for example, a strain of Streptomyces, loosely stoppering the necks of the flasks with cotton, and permitting the fermentation to proceed in a constant temperature room at about 28° C. for 3 to 5 days. For larger scale work it is preferable to conduct the fermentation in suitable tanks provided with an agitator and a means of aerating the fermentation medium. In this method, the nutrient medium is made up in the tank and sterilized by heating at 120° C. After cooling, the sterilized medium is inoculated with a suitable source of vegetative cellular growth of the microorganism and the fermentation is permitted to proceed for 2 to 4 days while agitating and/or aerating the nutrient medium and maintaining the temperature at about 28° C. This method of producing (—)(cis-1,2-epoxypropyl) phosphonic acid is particularly suited for the preparation of large quantities of the new antibiotic.

The fermentation using the (—)(cis-1,2-epoxypropyl) phosphonic acid producing microorganism can be carried out at temperatures ranging from about 20° C. to 40° C. For optimum results, however, it is more convenient to conduct the fermentations at temperatures between 26° C. and 30° C. The pH of the nutrient media suitable for growing the microorganism and producing the antibiotic may vary from about 5.0 to 9.0. The preferred pH range, however, is from about 6.0 to 7.5.

In carrying out the fermentation process, a cell suspension is prepared by the addition of sterile medium to an agar slant culture of a (—)(cis-1,2-epoxypropyl) phosphonic acid producing microorganism. Growth from the slant culture is then used to inoculate a seed flask and the seed flask is shaken at about 28° C. for 1 to 3 days in order to obtain good growth. The seed flask is then used to inoculate the production flasks. Alternatively, the seed flask can be inoculated from a lyophilized culture or a frozen inoculum.

The inoculation is generally carried out using about 1 ml. per 30 ml. of production medium containing the desired concentration of the phosphatide, and the fermentation is permitted to proceed for 2 to 4 days while agitating and/or aerating the nutrient medium and maintaining the temperature at about 28° C. All of the production flasks, i.e., those containing a production stimulant and the flasks used as controls, are then assayed, generally after 3 to 4 days, to determine the amount of antibiotic produced in each flask.

(—)(Cis-1,2-epoxypropyl)phosphonic acid is conveniently assayed by a disc-plate procedure using *Proteus vulgaris* MB-838 (ATCC 21100 and NRRL B-3361) as the test organism. The test culture is maintained as a slant culture on nutrient agar (Difco) plus 0.2% yeast extract (Difco). The inoculated slants are incubated at 37° C. for 18 to 24 hours and stored at refrigerator temperatures until used; fresh slants are prepared each week.

The inoculum for the assay plates is prepared each day by inoculating a 250 ml. Erlenmeyer flask containing 50 ml. of nutrient broth (Difco) plus 0.2% yeast extract (Difco) with a scraping from the slant. The flask is incubated on a shaking machine at 37° C. for 18 to 24 hours. The broth culture is then adjusted to 40% transmittance at a wave length of 660 m$\mu$, using a Bausch & Lomb Spectronic 20 by the addition of 0.2% yeast extract solution to the growth.

Uninoculated broth is used as a blank for this determination. 30 ml. of the adjusted broth is used to inoculate 1 liter of medium.

Nutrient agar (Difco) plus 0.2% yeast extract (Difco) is used as the assay medium. This medium is prepared, sterilized by autoclaving, and allowed to cool to 50° C. After the medium is inoculated, 10 ml. is added to sterile petri dishes and the medium is allowed to solidify.

The activity is expressed in terms of units, a unit being defined as the concentration of the antibiotic per milliliter which on a ½ inch paper disc will produce a zone diameter of 28 millimeters. Four concentrations of the antibiotic are employed for the preparation of the standard curve, namely 0.3, 0.4, 0.6 and 0.8 unit per milliliter; each concentration being obtained by the dilution in .05 M tris-(hydroxymethyl)-aminomethane buffer adjusted to pH 8.0. Four discs are placed on each of the five plates for the preparation of the standard curve, each plate containing one disc of each of the four concentrations of antibiotic shown above. The plates are incubated for 18 hours at 37° C., and the diameters of the zones of inhibition in millimeters are measured. An everage zone diameter for each concentration is calculated, from which a standard curve is prepared on semi-log graph paper. The slope of the line obtained is between 4 and 5.

The production flasks are then assayed by diluting the sample in 0.05 molar buffer at pH 8 to an appropriate concentration. The test organisms is *Proteus vulgaris* MB-838, and the assay medium is nutrient agar plus 0.2% yeast extract. Where either the disc plate or cylinder plates assayed is employed, from 10 to 15 ml. of the medium is poured per plate. Where the disc plate procedure is employed, the discs are dipped into 0.4 units per milliliter of the antibiotic solution and are placed on the plate in a position alternate to the sample. The plates are then incubated at 37° C. for 18 hours, and the zone diameters in millimeters are determined. Where the cylinder plate procedure is employed, 6 cylinders, 3 of the sample and 3 of the control solution, are used per plate, alternating the sample and control solution. The control solution contains 1 γ/ml. of the free acid. Five standard plates containing 6 levels of the standard ranging from 0.25 γ/ml. to 3.0 γ/ml. are employed. The assay is calculated by means of a Nomograph, and the results are reported in terms of units or gamma per milliliter. One unit of the free acid is equal to 2.8 γ.

The antibiotic can be purified and recovered in purer form by a number of procedures. One such procedure comprises adsorbing the antibiotic on alumina; either basic or acid-washed alumina is suitable for this purification. The adsorbed antibiotics can be eluted from the alumina most conveniently by aqueous or aqueous-alcoholic ammonium hydroxide solutions having a pH of about 11.2 and fractionally collecting the eluate. Purification of impure solid fractions containing the ammonium salt of (—)(cis-1,2-epoxypropyl)phosphonic acid can also be effected by dissolving such material in methanol, adding an equal volume of n-butanol, evaporating off the methanol, filtering off any butanol-insoluble material, and recovering a butanol solution containing the ammonium salt of the antibiotic of enhanced purity. The ammonium salt can then be obtained in solid form by evaporating the butanol solution to dryness under reduced pressure. Alternatively, the ammonium salt can be extracted from the butanol solution with water to obtain an aqueous solution of the ammonium salt of (—)(cis-1,2-epoxypropyl)phosphonic acid. The calcium salt of the antibiotic is produced by adding calcium hydroxide to the aqueous solution under reduced pressure. Alternatively, the calcium salt is also obtained by passing a solution of another salt of the antibiotic over a cation exchange resin on the calcium cycle. The calcium salt crystallizes from aqueous solutions having a concentration of 10 mg./ml. upon standing or with agitation.

(—)(Cis-1,2-epoxypropyl)phosphonic acid and its salts are useful antimicrobial agents, which are active in inhibiting the growth of both gram-positive and gram-negative pathogenic bacteria. This antibiotic and particularly its salts, are active against Bacillus, Escherichia, Staphylococci, Salmonella, and Proteus pathogens, and antibiotic-resistant strains thereof. Illustrative of such pathogens are *Escherichia coli, Salmonella schottmuelleri, Salmonella gallinarum, Proteus vulgaris, Proteus mirabilis, Proteus morganii*, and *Staphylococcus aureus*. Thus, (—)(cis-1,2-epoxypropyl)phosphonic acid and salts thereof can be used as antiseptic agents to remove susceptible organisms from pharmaceutical, dental, and medical equipment and other areas subject to infection by such organisms. Similarly, they can be used to separate certain microorganisms from mixtures of microorganisms. Salts of (—)(cis-1,2-epoxypropyl)phosphonic acid are also useful in the treatment of diseases caused by bacterial infections in man and animals and are particularly valuable in this respect, since they are active against resistant strains of pathogens. These salts are especially valuable, since they are effective when given orally, although they can also be administered parenterally.

The following examples are given for purposes of illustration and not by way of limitation.

Example 1

A seed medium (40 ml. in a 250 ml. baffled Erlenmeyer flask) of the following composition:

Cornstarch: 2.0%
L-asparagine: 0.5%
Sodium citrate: 0.4%
$K_2HPO_4$: 0.1%
$CaCl_2 \cdot 2H_2O$: 0.05%
$MgSO_4 \cdot 7H_2O$: 0.02%
$CoCl_2 \cdot 6H_2O$: 0.01%
$MnSO_4 \cdot 4H_2O$: 10 mg./liter
$CuCl_2 \cdot 2H_2O$: 0.25 mg./liter
$FeSO_4 \cdot 7H_2O$: 10 mg./liter
$H_3BO_3$: 0.56 mg./liter
Distilled water, q.s.

is adjusted to pH 6.8 to 7.0 and sterilized by heating at 121° C. at 15 p.s.i. for 15 minutes. The sterilized medium is inoculated with *Streptomyces fradiae* NRRL B-3359 grown on an agar slant of the following composition:

| | Percent |
|---|---|
| Cornstarch | 1.0 |
| L-asparagine | 0.1 |
| $K_2HPO_4$ | 0.1 |
| Agar | 2.0 |
| Tap water, q.s. | |

The inoculated medium is insulated on a 220 r.p.m. shaking machine for 48 to 72 hours and then is used immediately as stored at 5° C. until used. One ml. of the resulting inoculum is added to 30 ml. of sterile medium of the composition described above in 250 ml. Erlenmeyer flasks. Other flasks containing the same amount of sterile medium to which is added phosphatidyl ethanolamine such that the final concentration is 500 γ/ml. of the phosphatide. The inoculated flasks are grown on a 220 r.p.m. shaking machine at 28° C. for four days. The cells are then removed by centrifugation and the clarified broth is diluted with 0.05 M tris[hydroxymethylaminomethane] buffer to pH 8.0. The amount of (—)(cis-1,2-epoxypropyl)phosphonic acid produced in the fermentation broth is determined by assay with *Proteus vulgaris* NRRL B-336.

The following table shows the antibiotic content of the broths with and without the added phosphatidyl ethanolamine.

| | Antibiotic content, γ/ml. | |
|---|---|---|
| Expt | 1 | 2 |
| Addition: | | |
| None | 13.2 | 17.4 |
| Phosphatidyl ethanolamine (crystalline) | 24.4 | 26.2 |

Similar results are obtained when other (—)(cis-1,2-epoxypropyl)phosphonic acid producing strains of *Streptomyces fradiae* such as NRRL 3358, 3359, and 3360; *Streptomyces viridochromogenes* such as NRRL 3413, 3414, 3415, 3416, and 3427; or *Streptomyces wedmorensis* such as NRRL 3428 are used in place of *Streptomyces fradiae* NRRL B-3359.

Example 2

When the process of Example 1 is repeated using 500 γ/ml. of phosphatidyl choline (soybean lecithin) in place of phosphatidyl ethanolamine, the assays of the resulting broths are shown in the following table:

| | Antibiotic content, γ/ml. | | | |
|---|---|---|---|---|
| Expt | 1 | 2 | 3 | 4 |
| Addition: | | | | |
| None | 6.6 | 11.0 | 15.3 | 16.5 |
| Phosphatidyl choline (soybean lecithin) | 9.5 | 14.3 | 21.6 | 25.3 |

Similar results are obtained when other (—)(cis - 1,2-epoxypropyl)phosphonic acid producing strains of *Streptomyces fradiae* such as NRRL 3358, 3359, 3360; *Streptomyces viridochromogenes* such as NRRL 3413, 3414, 3415, 3416, 3427; or *Streptomyces wedmorensis* NRRL 3426 are used in place of *Streptomyces fradiae* NRRL B–3359.

Example 3

When the process of Example 1 is repeated reducing the amount of phosphatidyl ethanolamine from 500 γ/ml. to 50 γ/ml., the following results are obtained.

| Addition: | Antibiotic content, γ/ml. |
|---|---|
| None | 16.5 |
| Phosphatidyl ethanolamine | 18.5 |

When in the above procedure other (—)(cis - 1,2-epoxypropyl)phosphonic acid producing strains of *Streptomyces fradiae* such as NRRL 3358, 3359 and 3360; *Streptomyces viridochromogenes* such as NRRL 3413, 3414, 3415, 3416 and 3427; or *Streptomyces wedmorensis* such as NRRL 3428 are used in place of *Strepomyces fradiae* NRRL B–3359, similar results are obtained.

Example 4

When the procedure of Example 1 is repeated using 500 γ/ml. of phosphatidyl L-serine in place of phosphatidyl ethanolamine, the following results are obtained:

| | otic content, γ/ml. | |
|---|---|---|
| Expt | 1 | 2 |
| Addition: | | |
| None | 15.3 | 25.8 |
| Phosphatidyl-L-serine | 18.7 | 26.7 |

Similar results are obtained when in the above procedure other (—) (cis-1,2-epoxypropyl)phosphonic acid producing strains of *Streptomyces fradiae* such as NRRL 3358, 3359, and 3360; *Streptomyces viridochromgenes* such as NRRL 3413, 3414, 3415, 3416 and 3427; *Streptomyces wedmorensis* such as NRRL 3428 are used in place of *Streptomyces fradiae* NRRL B–3359.

Example 5

Similar results are obtained when the procedure of Example 1 is followed using instead of phosphatidyl ethanolamine, either of phosphatidyl choline or L-cysteine, alone or in combination, the following is obtained:

| | Antibiotic content, γ/ml. | | |
|---|---|---|---|
| Expt | 1 | 2 | 3 |
| Addition: | | | |
| None | 13.5 | 13.5 | 16.5 |
| 500 γ/ml. of L-cysteine | 19.5 | 19.5 | 21.1 |
| 500 γ/ml. of phosphatidyl choline | 24.5 | 15.7 | 25.3 |
| 500 γ/ml. of each of L-cysteine and phosphatidyl choline | 37.1 | 28.0 | 31.1 |

Similar results are obtained when in the above procedure other (—) (cis - 1,2-epoxypropyl)phosphonic acid producing strains of *Streptomyces fradiae* such as NRRL 3358, 3359, and 3360; *Streptomyces viridochromogenes* such as NRRL 3413, 3414, 3415, 3416 and 3427; or *Streptomyces wedmorensis* such as NRRL 3428 are used in place of *Streptomyces fradiae* NRRL B–3359.

Example 6

When the procedure of Example 1 is followed using instead of phosphatidyl ethanolamine, either cephalin or L-cysteine, alone or in combination, the following is obtained:

| | Antibiotic content | |
|---|---|---|
| Expt | 1 | 2 |
| Addition: | | |
| None | 17.0 | 13.5 |
| 500 γ/ml. of L-cysteine | 21.1 | 19.5 |
| 50 γ/ml. of cephalin | 18.5 | |
| 500 γ/ml. of cepahlin | | 20.1 |
| 500 γ/ml. of L-cysteine and 50 γ/ml. of cephalin | 22.8 | 40.0 |

When in the above procedure other (—)(cis) - 1,2-epoxypropyl)phosphonic acid producing strains of *Streptomyces fradiae* such as NRRL 3358, 3359, and 3360; *Streptomyces viridochromogenes* such as NRRL 3413, 3414, 3415, 3416 and 3427; or *Streptomyces wedmorensis* such as NRRL 3428 are used in place of *Streptomyces fradiae* NRRL, B–3359, similar results are obtained.

What is claimed is:

1. An improved process for the preparation of (—) (cis-1,2-epoxypropyl)phosphonic acid which comprises growing a (—)(cis-1,2-epoxypropyl)phosphonic acid producing microorganism from the group consisting of *Streptomyces fradiae*, *Streptomyces viridochromogenes* and *Streptomyces wedmorensis* in an aqueous nutrient medium under aerobic conditions until substantial antibiotic activity is imparted to said medium, the improvement comprising growing said microorganism in a nutrient medium containing at least 50 γ/ml. of one or more phosphatides from the group consisting of phosphatidyl ethanolamine, phosphatidyl choline, phosphatidyl L-serine or cephalin.

2. The process of claim 1 where the phosphatide is present in the nutrient medium in an amount equivalent to from 50 to 1000 γ/ml.

3. The process of claim 1 where the strain of Streptomyces is a species of *Streptomyces fradiae*.

4. The process of claim 1 where the strain of Streptomyces is a species of *Streptomyces wedmorensis*.

5. The process of claim 1 where the strain of Streptomyces is a species of *Streptomyces viridochromogenes*.

6. An improved process for the preparation of (—) (cis-1,2-epoxypropyl)phosphonic acid which comprises growing a (—)(cis-1,2-epoxypropyl)phosphonic acid producing microorganism from the group consisting of *Streptomyces fradiae*, *Streptomyces viridochromogenes* and *Streptomyces wedmorensis* in an aqueous nutrient medium under aerobic conditions until substantial antibiotic activity is imparted to said medium, the improvement comprising growing the microorganism in a nutrient medium containing at least 50 γ/ml. of one or more phosphatides from the group consisting of phosphatidyl ethanolamine, phosphatidyl choline, phosphatidyl L-serine or cephalin and at least 50 γ/ml. of L-cysteine.

7. The process of claim 6 where the phosphatide is present in the nutrient medium in an amount equivalent to from 50 to 1000 γ/ml., and the L-cysteine is present in the nutrient medium in an amount equivalent to from 50 to 1000 γ/ml.

8. The process of claim 6 where the strain of Streptomyces is a species of *Streptomyces fradiae*.

9. The process of claim 6 where the strain of Streptomyces is a species of *Streptomyces wedmorensis*.

10. The process of claim 6 where the strain of Streptomyces is a species of *Streptomyces viridochromogenes*.

References Cited

Hendlin et al., "Phosphonomycin, a New Antibiotic Produced by Strains of Streptomyces," Science, vol. 66, 1969, pp. 122–123.

Derwentfarmdoc No. 893, Abstracting BE 718,507, publ. Jan. 24, 1969.

JOSEPH M. GOLIAN, Primary Examiner

U.S. Cl. X.R.

195—114